(12) United States Patent
Lindsey (10) Patent No.: US 10,868,800 B2
(45) Date of Patent: Dec. 15, 2020

(54) SECURE COMMUNICATIONS SYSTEM AND DEVICE

(71) Applicant: WK Consulting, LLC, Chickasha, OK (US)

(72) Inventor: Wallace Lindsey, Chickasha, OK (US)

(73) Assignee: WK Consulting, LLC, Chickasha, OK (US)

( * ) Notice: Subject to any disclaimer, the term of this patent is extended or adjusted under 35 U.S.C. 154(b) by 197 days.

(21) Appl. No.: 16/054,119

(22) Filed: Aug. 3, 2018

(65) Prior Publication Data

US 2019/0044919 A1 Feb. 7, 2019

Related U.S. Application Data

(60) Provisional application No. 62/540,975, filed on Aug. 3, 2017.

(51) Int. Cl.
| | |
|---|---|
| *G06F 1/16* | (2006.01) |
| *H04L 29/06* | (2006.01) |
| *G02B 27/01* | (2006.01) |
| *A42B 3/04* | (2006.01) |
| *H04B 1/3827* | (2015.01) |
| *A42B 3/30* | (2006.01) |
| *A42B 3/28* | (2006.01) |
| *G06F 21/84* | (2013.01) |
| *G06F 21/32* | (2013.01) |

(52) U.S. Cl.
CPC .......... *H04L 63/0428* (2013.01); *A42B 3/042* (2013.01); *A42B 3/0406* (2013.01); *A42B 3/283* (2013.01); *A42B 3/286* (2013.01); *A42B 3/30* (2013.01); *G02B 27/017* (2013.01); *G06F 1/163* (2013.01); *G06F 21/32* (2013.01); *G06F 21/84* (2013.01); *H04B 1/385* (2013.01); *H04B 2001/3866* (2013.01); *H04L 63/0861* (2013.01)

(58) Field of Classification Search
CPC ..... H04L 63/0428; G06F 21/32; G06F 21/84; A42B 3/0506; A42B 3/30; H04B 1/385
See application file for complete search history.

(56) References Cited

U.S. PATENT DOCUMENTS

| | | | |
|---|---|---|---|
| 2013/0093585 A1* | 4/2013 | Ambani ................. | A42B 3/306 340/475 |
| 2014/0081631 A1* | 3/2014 | Zhu ..................... | G10L 21/0208 704/226 |
| 2016/0234356 A1* | 8/2016 | Thomas ............... | H05K 9/0069 |

* cited by examiner

*Primary Examiner* — Ellen Tran
(74) *Attorney, Agent, or Firm* — Travis R. Banta; TechLaw Ventures, PLLC (57) ABSTRACT

A secure communication system includes a wearable secure communication device which may receive and transmit information via a network. A wearable secure communication device may include a noise generator. The wearable secure communication device further includes a power input connection. Additionally, the wearable secure communication device may include a communication processor. The secure communication system and the wearable secure communication device may provide access to a secure information exchange system.

20 Claims, 5 Drawing Sheets

SECURE COMMUNICATIONS SYSTEM AND DEVICE

CROSS-REFERENCE TO RELATED APPLICATIONS

This application claims the benefit of U.S. Provisional Application No. 62/540,975 filed Aug. 3, 2017, which is incorporated herein by reference in its entirety, including but not limited to those portions that specifically appear hereinafter, the incorporation by reference being made with the following exception: In the event that any portion of the above-referenced application is inconsistent with this application, this application supercedes said above-referenced application.

BACKGROUND

1. Technical Field

This disclosure relates generally to a secure communication systems and device. The secure communications system may be stored in a secure place and provide access to a secure communication environment by an authenticated user of the secure communication device. The secure communications system may allow a user to conduct secure communications with another person who has access to a secure communications network or may allow a user to access secure information.

2. Description of the Related Art

While secure communications have always been important, the prevalence of electronic communications has facilitated enhanced communications opportunities while also presenting new challenges to maintain the security of the electronic communications. Two non-exclusive methods of ensuring the security of a message were developed prior to the advent of electronic communication. First, messages were carried by a courier, carried by an armed escort, hidden, or even by means of animal conveyance as a way to prevent a message from coming into the possession of an unintended recipient. In short, access to the messages was limited. Second, messages were encrypted using cryptography so that even if a message was obtained by an unintended recipient, the unintended recipient could not decipher the message. In short, the message was coded so that if the message was intercepted, it was unreadable.

Electronic communications have built on these two methods of ensuring security of an electronic message. For example, entities that desire maximum security communications (governments, companies, militaries, and etc.) may implement a network that does not rely on the Internet. In other words, these entities may develop intranets that are disconnected from the Internet, essentially creating a sub-Internet with access points only being available in certain secure locations. Further, these entities further encrypt secure communications with electronic cryptography or other encryption, preventing anyone without knowledge of a particular code or access to a particular cipher key from reading the message, even if obtained.

Implementing these security measures introduces certain problems. First, by limiting access to a secure network, authorized users have more difficulty accessing the network. For example, if access to the secure network is provided only in certain secure locations, an authorized user must physically go to a certain location to gain access to the secure network. Second, the security of a secure location must be constantly maintained, requiring a guard or sophisticated lock to prevent unauthorized access to a secure location.

Lesser levels of security have also been implemented that make access to electronic information and electronic communication easier. For example, a cellular phone may provide access to electronic information and electronic communication. A user may take certain precautions to prevent others from seeing the user's phone screen or may retreat to a location where the user may be alone to allow the user to talk without being overheard by others. However, in a non-secure location, a user may have very little ability to maintain the security of communications, even though secure communications are desirable.

It is therefore one object of this disclosure to obviate the need for a secure location in which to conduct secure communications. It is a further object of this disclosure to provide access to electronic communications via a secure communication device. It is a further object of this disclosure to provide a communications system that provides a user with access to a secure network.

It is a further object of this disclosure to provide a secure communication device which includes authentication mechanisms to ensure a user is an authenticated user. It is a further object to prevent others from observing a personal monitor and prevent others from eavesdropping on a secure communication event.

Finally, it is an object of this disclosure to provide a secure communication system to which a secure communication device may be connected to allow a user to participate in secure communications or access secure information.

In one embodiment, a secure communication system is provided which may include a helmet, authentication devices, user input devices (keyboards, mice, touch screens, etc.), to allow a user to access secure information or participate in secure communication with another authenticated user. In another embodiment, a helmet may be provided which provides connections to a secure communication network while providing a monitor only visible to a user and in a manner that prevents others from eavesdropping on the user's secure communication events.

SUMMARY

In one embodiment, a secure communication system is provided. The secure communication system includes a wearable secure communication device. The wearable secure communication device may include a noise generator. The wearable secure communication device may further include a power input connection. Additionally, the wearable secure communication device may include a communication processor. Furthermore, the wearable secure communication device may receive and transmit information via a network.

In another embodiment, a wearable secure communication device may include a noise generator. The wearable secure communication device may further include a power input connection. Additionally, the wearable secure communication device may include a communication processor.

BRIEF DESCRIPTION OF THE DRAWINGS

The accompanying drawings illustrate several embodiments of a secure communication system and device. The illustrated embodiments are exemplary and do not limit the scope of the disclosure.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the system and device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
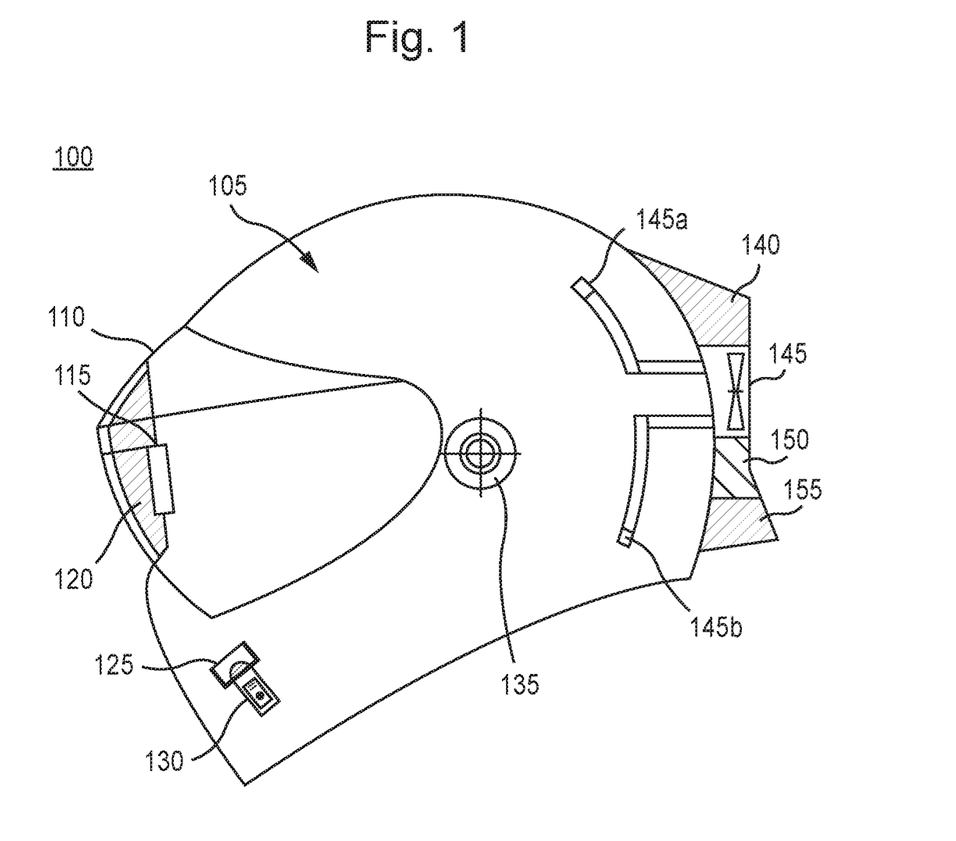
FIG. 1 illustrates one embodiment of a secure communication device, including internal components.

FIG. 1 illustrates one embodiment of a wearable secure communication device 100, including various internal components. Wearable in this context means the device can be worn on the head or face of a user/wearer. Wearable secure communication device 100 may be implemented as a helmet 105 which fully encapsulates a user's head and may, or may not, be sealed about the user's neck to ensure that helmet 105 is soundproof, such that speech or sound generated inside helmet 105 is fully contained within helmet 105 and not perceptible to another person. Helmet 105 includes a visor 110 which may or may not be hinged such that visor 110 may be raised to allow a user to see out of helmet 105 or may be lowered to provide the user with access to display screens 115 implemented within helmet 105. As shown in FIG. 1, visor 110 is in a lowered position and provides one or more display screens, preferably two, that are viewable only by a wearer of helmet 105. Display screens 115 may be implemented using any suitable display screen technology, such as dual VGA monitors, plasma screens, LCD screens, OLED displays, LED displays, CRT displays, for example. Visor 110 may further include a retinal scanner 120 which serves as a biometric authentication device. Retinal scanner 120 may be used to authenticate user by obtaining an image of the user's retina for comparison of the retinal image to a library or database of retinal images of authenticated users. Authentication of specific users will be discussed below.

Helmet 105 may further include a microphone 125 to receive speech input provided by a user. Helmet 105, as discussed below, may transmit the speech input over a secure connection to another person authorized to access a secure communications environment. Microphone 125 may further be connected to a voice print analyzer 130 as another device that may be used to authenticate an authorized user by obtaining a voice print of the user's voice for comparison of the voice print to a library or database of voice prints of authenticated users. Authentication of specific users will be discussed below.

Helmet 105 may further include an earphone 135 which may be implemented in a number of ways. For example, earphone 135 may be implemented as an in-ear speaker (i.e., an earbud), a headset that provides a speaker that rests on the ear of the user, or a speaker configured to produce sound at a volume comfortable to most users, both loud enough to be heard by an authenticated user and quiet enough to not cause pain or irritate the authenticated user. Earphone 135 may provide the user with auditory input obtained from other sources, such as spoken input from another user.

To further facilitate a secure environment, helmet 105 may include a white and/or a pink noise generator 140. A white noise generator generates noise that has equal intensity at different frequencies and may be used to drown out noise that is both internal to helmet 105 and external to helmet 105 (i.e., the authenticated user cannot hear sounds generated external to helmet 105). For example, white noise generated by noise generator 140 may be used to counteract the user's speech inside helmet 105 such that the user's speech is imperceptible to another person outside helmet 105. Similarly, noise generator 140 may be used to counteract noise that is external to helmet 105 to prevent the authenticated user from experiencing disruption by noise generated outside of helmet 105. Noise generator 140 may also generate pink noise which generates noise in a power spectral density that is inversely proportional to the frequency of the signal such that each octave (halving or doubling of the frequency) carries an equal amount of noise energy. Pink noise may be generated for reasons similar to those just discussed for white noise inside helmet 105. And, in some embodiments, noise generator 140 may generate only white noise, only pink noise, no noise, or both white and pink noise simultaneously, as desired by an authenticated user of helmet 105.

Helmet 105 may provide a temperature controlled environment. For example, helmet 105 may include a fan 145 which may blow warm air, cold air, and or fresh air into helmet 105 through air duct 145*a* and air duct 145*b*. Air ducts may be implemented throughout helmet 105 and the locations shown in FIG. 1 of air duct 145*a* and air duct 145*b* are merely representative of air ducts disposed within helmet 105. Air duct 145*a* and air duct 145*b* are also representative of a type of ducting system that provides a Z shaped duct that acoustically reduces or silences sound within helmet 105, such that sound generated within helmet 105 is not conducted to or is perceptible outside helmet 105. In one embodiment, helmet 105 may be fitted with a vent that allows air introduced by fan 145 to be exhausted from helmet 105 to allow air to flow through helmet 105. In one embodiment, air duct 145*a* may allow for air to be blown into helmet 105 while air duct 145*b*, for example, may allow air to be exhausted from helmet 105. Various implementations for the receiving and exhausting air through various air ducts are possible and not limited to the specific embodiments discussed here.

Helmet 105 may be powered by a power port 150. In one embodiment, power port 150 may connect to an electrical outlet to receive power. In another embodiment, power port 150 may receive a battery in a battery compartment. Any battery sufficient to power the various elements of helmet 105 for a suitable amount of time are acceptable for use with helmet 105. Power port 150 may provide electricity to various components within helmet 105, including to a processor 155 which executes computer instructions to perform the functionalities of helmet 105 such as communications. Processor 155 may also act to facilitate communications between different users of the network as a communications processor Processor 155 may be a hardware component that may execute one or more application programs and be implemented as one or more hardware components. For example, application programs may include software modules, sequences of instructions, routines, data structures, display interfaces, and other types of structures that execute operation. Further, hardware components may include a combination of CPUs, such as CPU 155, buses, volatile and non-volatile memory devices, non-transitory computer readable memory devices and media, data processors, control devices, transmitters, receivers, antennas, transceivers, input devices, output devices, network interface devices, and other types of components that are apparent to those skilled in the art. Essentially, processor 155 may allow an authorized user to connect to a secure communication line, whether telephone, internet, satellite, intranet, or other secure communication line, through various connections installed in helmet 105 to provide processor 155 access to the secure communication line.

Other hardware components may be installed within helmet 105. For example, hardware components necessary to allow communication between an authenticated user via a secure communication system may be included within helmet 105. Helmet 105 may include various ports for connecting various communications and power cables to helmet 105 using various communications protocols. Helmet 105 may include a transmitter/receiver for communicating wirelessly using any communication protocol, such as, Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication or data access between helmet 105 and another point on a secure communications network.

Finally, helmet 105, in one embodiment, may be built to technical specifications established by various government entities to meet security procedures and protocols. Helmet 105 may be suitable to replace certain secure facilities by meeting the same rigorous directive requirements, while drastically reducing cost, time, coordination, cumbersome construction, and eventual decommissioning.

Figure 2:
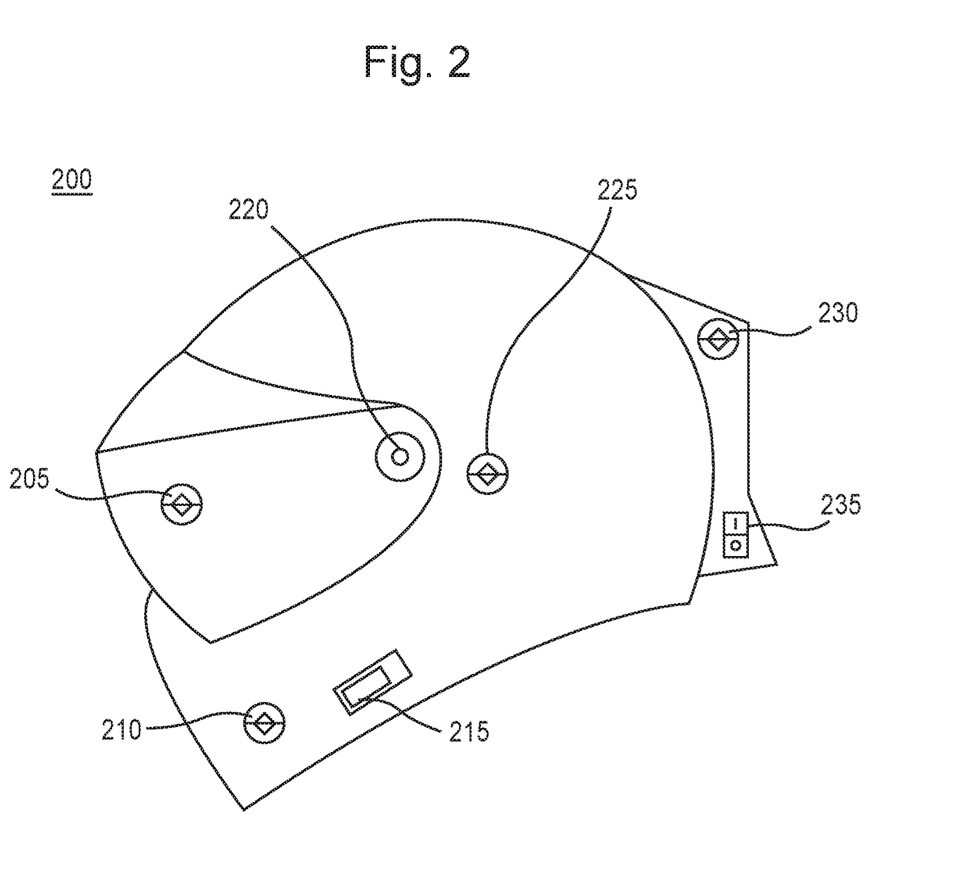
FIG. 2 illustrates an exemplary implementation of the secure communication device including external components.

FIG. 2 illustrates an exemplary implementation of a secure communication device implemented as helmet 200 and showing external components. An external portion of helmet 200 includes a video interface button 205 on a visor of helmet 200, which is similar in implementation to visor 110, shown in FIG. 1. Video interface button 205 allows an authenticated user to interact with visor 110 to begin or cease operation of a video display screen, such as display screen 115 shown in FIG. 1. In this manner, an authenticated user may, for example, turn off the video display to open visor 110 and interact with a physical environment outside of helmet 200. Helmet 200 may further include a voice interface button 210 which controls operation of microphone 125, shown in FIG. 1. Voice interface button 210 may turn microphone 125 on or off depending on the preferences of the authenticated user. For example, should an authenticated user desire to only view data, the authenticated user may choose to turn microphone 125 off via voice interface button 210. Or, for example, an authenticated user may join a teleconference with more than one participant and choose to turn off microphone 125 via voice interface button 210 in order to minimize noise injected into the conversation. When the authenticated user wishes to provide voice input, microphone 125 may be turned on by interaction with voice interface button 210.

Helmet 200 may further include a fingerprint scanner 215. Fingerprint scanner 215 may be used to authenticate an authorized user by obtaining a fingerprint of a user's finger for comparison to fingerprints stored in a library or database of fingerprints of authorized users. Authentication of specific users will be discussed below.

Helmet 200 may further include a hinge 220 which allows a user to articulate visor 110 between an open and closed position. In one embodiment, visor 110 may be programmed to automatically shut off when opened and require the authenticated user to interact with video interface button 205 to resume display of a video on the display screen. Hinge 220 may be sealed as discussed below.

Helmet 200 may further include an earphone interface button 225 which exerts control over earphone 135, shown in FIG. 1. Earphone interface button 225 may turn on earphone 135 or may turn off earphone 135. Similarly, earphone interface button 225 may be usable by the authenticated user to adjust the volume of earphone 135. In one embodiment, an authenticated user may raise the volume of earphone 135 to turn on auditory input and may lower the volume of earphone 135 to turn off auditory input by interacting with earphone interface button 225.

Helmet 200 may further include a white/pink noise generator interface button 230 which exerts control over noise generator 140, shown in FIG. 1. Noise generator interface button 230 may turn on noise generator 140 or may turn off noise generator 140. Similarly, noise generator interface button 240 may be usable by the authenticated user to adjust a volume or baseline level of noise generated by noise generator 140. In one embodiment, an authenticated user may further interact with noise generator interface button 230 to turn on white noise, turn on pink noise, turn on both white noise and pink noise simultaneously, turn off white noise, turn off pink noise, or turn off all noise generated by noise generator 140.

Helmet 200 may further include a power switch 235 which allows an authenticated user to selectively allow power to flow to the components of helmet 200. Switch 235 may be electrically coupled to power port 150 and may interrupt power supplied through power port 150 to selectively turn off helmet 200.

Figure 3:
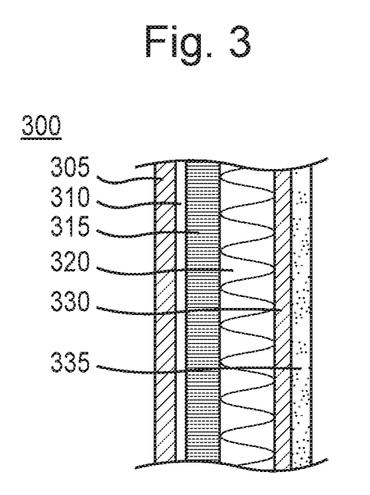
FIG. 3 illustrates a cross sectional view of the secure communication device construction.

FIG. 3 illustrates a cross sectional view of a secure communication device 300. Secure communication device 300 may be implemented as helmet, such as helmet 200, shown in FIG. 2 or secure communication device 100, shown in FIG. 1. Thus, FIG. 3 illustrates a cross sectional view of a helmet. In one embodiment, secure communication device 300 may include a shell 305 comprised of a polycarbonate plastic material as an external surface on secure communication device 300. Other appropriate plastics may also be used. Secure communication device 300 may include a wiring cavity 310 which houses wires that provide power to and receive information from various components within secure communication device 300. Further, wiring cavity 310 protects wires within secure communication device 300 from rubbing or chafing.

Secure communication device 300 may create wiring cavity 310 between shell 305 and a layer of mass loaded vinyl 315 disposed within secure communication device 300 in a manner that creates wiring cavity 310 between shell 305 and the layer of mass loaded vinyl 315. The layer of mass loaded vinyl 315 serves a number of purposes. First, the layer of mass loaded vinyl 315 acts as a semi-rigid barrier to provide structural support to secure communication device 300. Second, the layer of mass loaded vinyl 315 provides a degree of rigidity for secure communication device 300 that ensures secure communication device 300 remains in position on an authenticated user's head. Third, mass loaded vinyl enjoys relatively high sound attenuation properties. In combination with a layer of aerogel 320, this configuration shown in FIG. 3 may enjoy an STC ("sound transmission class") rating of STC-50 or higher.

For the authenticated user's comfort, and for sound attenuation purposes, a layer of aerogel 320 may be disposed on an inside surface of the layer of mass loaded vinyl 315. The layer of aerogel 320 may allow a "form fit" to an authenticated user that tends to keep secure communication device 300 in place on the authenticated user's head while spreading contact between secure communication device 300 and the authenticated user's head over a greater surface area of the user's head, enhancing comfort. The layer of aerogel 320 may also serve as further electrical insulation between the authenticated user's head and the wires disposed in wiring cavity 310.

Secure communication device 300 may further include a polycarbonate layer 330 which provides a substantially rigid location within secure communication device 300 for mounting various internal components such as earphone 135, shown in FIG. 1, for example. Finally, user comfort may be further enhanced within secure communication device 300 by providing a moisture wicking insert 335 as a lining along an inside surface of secure communication device 300. Moisture wicking insert 335 absorbs perspiration from an authenticated user's head, which may occur when the user's head is within secure communication device 300. Moisture wicking insert 335 wicks perspiration away from the authenticated user's head, thereby also cooling the authenticated user's head.

Figure 4:
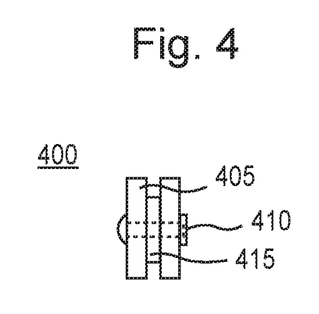
FIG. 4 illustrates a cross sectional view of a visor hinge of the secure communication device.

FIG. 4 illustrates a cross sectional view of a visor hinge 400 of a secure communication device, such as secure communication device 100 shown in FIG. 1 and helmet 200 shown in FIG. 2. Visor hinge 400 may be implemented to connect visor 110, shown in FIG. 1 to helmet 105, also shown in FIG. 1. In one embodiment, a visor material 405 may be provided to function as a visor. Visor material 405 may include, for example, a double glazed plexiglass which allows an authenticated user to see from the inside of visor 110 to the outside of visor 110 and similarly prevent other people from seeing from the outside of visor 110 to the inside of visor 110. Visor hinge 400 includes a hinge bolt and fastener 410 which connects visor 110 to secure communication device 100, while allowing visor 110 to be raised and lowered about visor hinge 400. Visor hinge 400 may further be sealed by a gasket 415. Gasket 415 may be STC-50 ("sound transmission class 50") rated to provide an adequate seal that soundproofs the inside of secure communication device 100.

Figure 5:
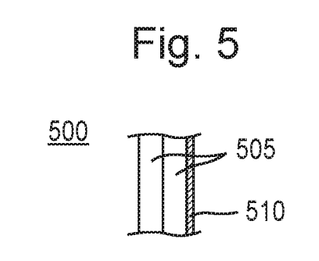
FIG. 5 illustrates a cross sectional view of a visor of the secure communication device.

FIG. 5 illustrates a cross sectional view of a visor 500 of a secure communication system and secure communication device, such as secure communication device 100, shown in FIG. 1. Visor 500 may be similar in implementation and description to visor 110 shown in FIG. 1 and described above. Visor 500 includes at least two layers of double glazed plexiglass 505 which allows an authenticated user to see from the inside of visor 500 to the outside of visor 500 and similarly prevent other people from seeing from the outside of visor 500 to the inside of visor 500. In one embodiment, an inside layer of double glazed Plexiglas 505 may include a privacy film 510 which provides an opaque surface along the inside of visor 500, preventing the authenticated user from seeing out and also preventing any person outside secure communication device 100 from seeing inside visor 500.

Figure 6:
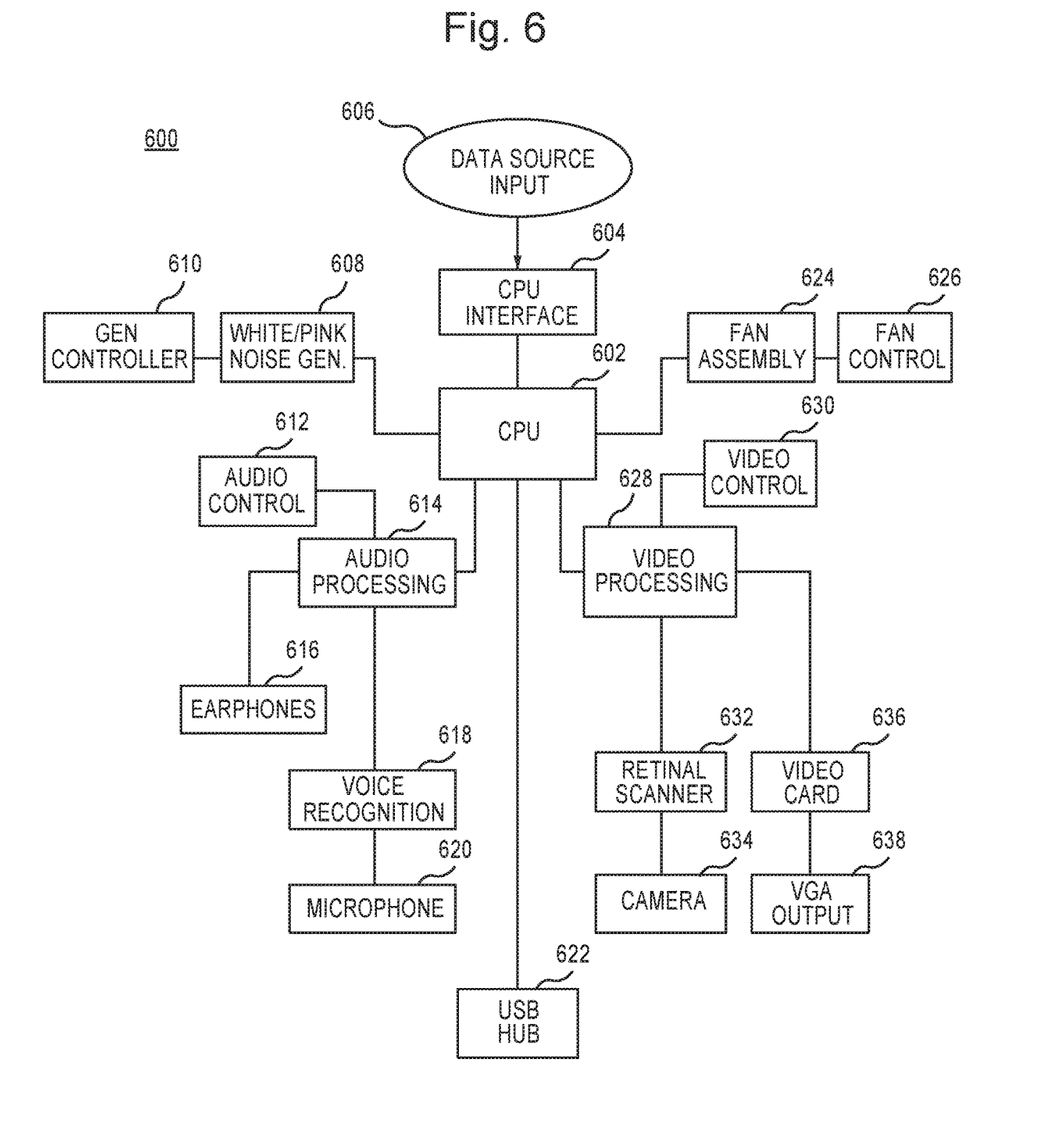
FIG. 6 illustrates a secure communication system.

FIG. 6 illustrates a secure communication system 600. Secure communication system 600 provides a system which may be used with or without a secure communication device, such as secure communication device 100, shown in FIG. 1. Secure communication system 600 may also include many secure communication devices 100 in various locations both on and off of the planet Earth. Secure communication system 600 includes a CPU 602, which serves as a central processing unit or processor for secure communication system 600. CPU 602 may be a hardware component that may execute one or more application programs and one or more hardware components. For example, application programs may include software modules, sequences of instructions, routines, data structures, display interfaces, and other types of structures that execute operation. Further, hardware components may include a combination of CPUs, such as CPU 602, buses, volatile and non-volatile memory devices, non-transitory computer readable memory devices and media, data processors, control devices, transmitters, receivers, antennas, transceivers, input devices, output devices, network interface devices, and other types of components that are apparent to those skilled in the art. Essentially, CPU 602 may allow an authorized user to connect to a secure communication line, whether telephone, internet, satellite, intranet, or other secure communication line, through various connections installed in secure communication system 600 to provide CPU 602 access to the secure communication line.

CPU 602 may execute computer instructions based on input from an authorized user. For example, an authorized user may interface with CPU interface 604 to receive information from a data source input 606. Data source input 606 may include any kind of information. Examples of information provided as data source input 606 include text data, picture data, video data, audio data, voice data, and, in some embodiments, include tactile data. However, any data required by an authorized user or desired to be communicated to another user of communication system 600 may be included in data source input 606.

Communication system 600 may include a white/pink noise generator 608. Noise generator 608 may be similar in implementation and description to noise generator 140, discussed above with respect to FIG. 1. A white noise generator generates noise that has equal intensity at different frequencies and may be used to drown out noise that is both internal to an environment of communication system 600 and external to an environment of communication system 600. For example, white noise generated by noise generator 608 may be used to counteract the user's speech inside communication system 600 such that the user's speech is imperceptible to another person outside communication system 600. Similarly, noise generator may be used to counteract noise that is external to secure communication system 600 to prevent the authenticated user from experiencing disruption by noise generated outside of secure communication system 600. Noise generator 608 may also generate pink noise which generates noise in a power spectral density that is inversely proportional to the frequency of the signal such that each octave (halving or doubling of the frequency) carries an equal amount of noise energy. Pink noise may be generated for reasons similar to those just discussed for white noise inside communication system 600. And, in some embodiments, noise generator 608 may generate only white noise, only pink noise, no noise, or both white and pink noise simultaneously, as desired by a user of communication system 600. Noise generator 608 may be controlled by a noise generator controller 610 which may be adjustable by a button associated with noise generator controller 610, as discussed above.

CPU 602 may further have access to a separate audio processor 614 or may also include an integral audio processor 614. Audio processor 614 receives data source input 606 that includes audio data via CPU 602 and allows an authenticated user to adjust parameters of the audio data via a button associated with audio control 612. In this manner, audio data may be provided to an authenticated user via earphones 616. Moreover, audio processor 614 may also be used to receive voice recognition data from a voice recognition module 618 after an authenticated user speaks into a microphone 620 based on user interaction with a microphone activation button associated with audio control 612. Thus, voice data may be used as a biometric authorization tool within communication system 600.

CPU 602 may also include a connection to a USB hub 622 to allow peripheral devices, such as a keyboard device, a mouse device, a touch interface, a fingerprint scanner, and a host of other peripheral devices to interact with secure communication system 600. It should be noted that while all USB protocols are desired implementations, this disclosure is not limited solely to USB connectors and protocols. Any input protocol and physical connectors may be installed within communication system 600 to facilitate any desirable form of communication and input, whether wired or wireless using any desirable protocol. USB hub 622 is merely representative of various connections, communications, and interface protocols that may be desirable for implementation within secure communication system 622.

CPU 602 may further interface with a fan assembly 624 and fan control 626. Fan assembly 624 may include a fan, similar to fan 145 shown in FIG. 1, which blows air into secure communication system 600. Fan control 626 may control a speed of fan assembly 624 and may also have control over selective ducting, such as duct 145a and duct 145b shown in FIG. 1. In other words, fan control 626 may adjust the direction and air flow of air blown by fan assembly 624 in response to elevated temperature readings, fogging on the visor, or other temperature and humidity related conditions. Fan control 626 may be automatic based on one or more sensors disposed inside secure communication system 600 to alleviate temperature and humidity related conditions within secure communication system 600.

CPU 602 may also include a video processor 628 as an integral component of CPU 602 or may have access to a separate video processor 628 to perform video processing. Video processor 628 may include video control 630 which may also include a video interface button, similar to video interface button 205 shown in FIG. 2. Video control 630 may operate video VGA output 638 on display screens, such as display screens 115 shown in FIG. 1 through video card 636. An authenticated user may interact with video control 630 to toggle between display information; switch information shown on one display to another display (and vice versa); adjust color, brightness, contrast, balance, and other video controls; and to turn display screens on and off. Video processor 628 may also interface with a retinal scanner 634 as a biometric authentication mechanism which may receive retinal information via camera 634. Camera 634 may also provide an image of the authenticated user during secure communication sessions to other users who may be participating in a secure communication session.

Figure 7:
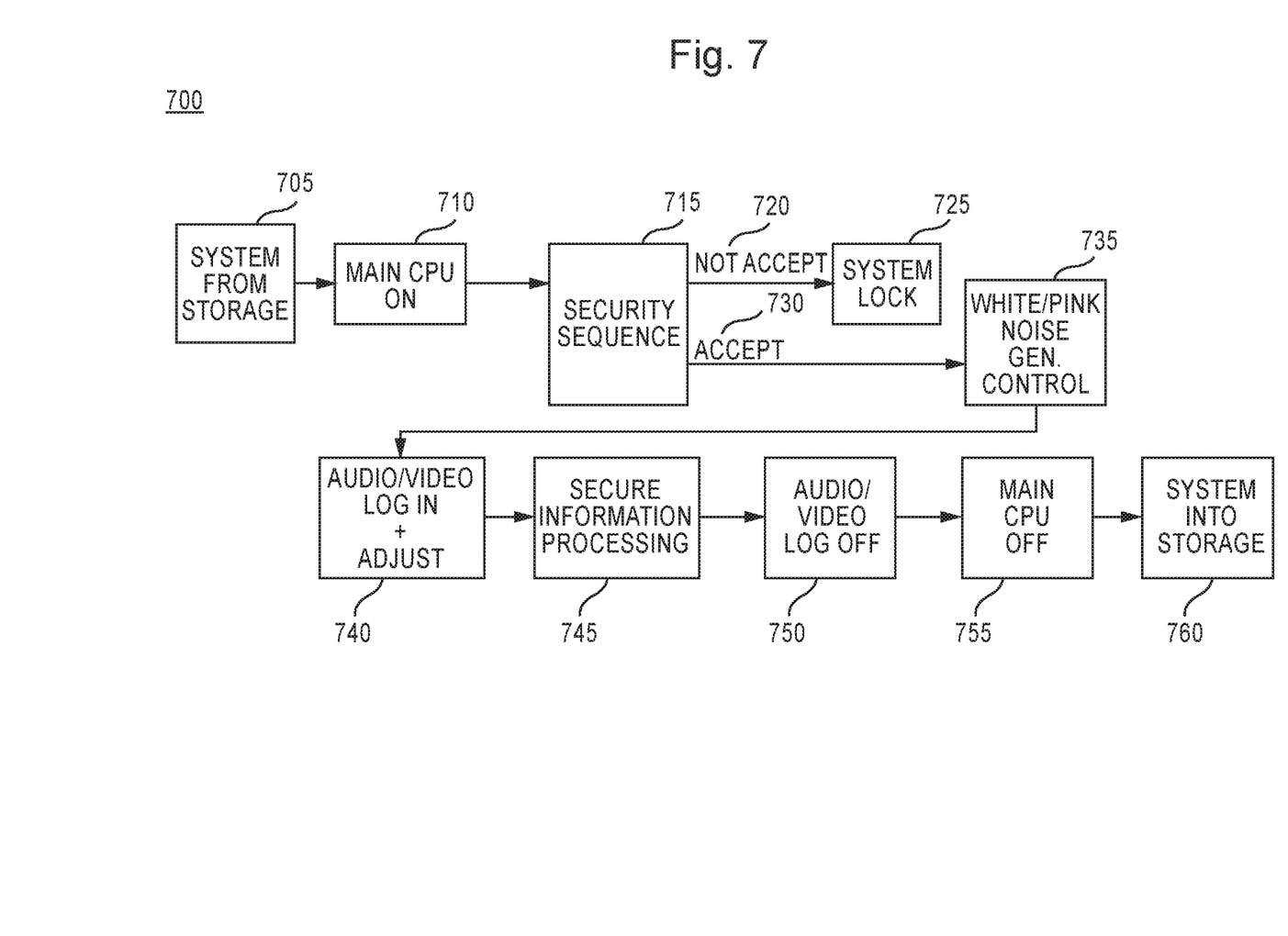
FIG. 7 illustrates a method for accessing a secure communication system and secure communication device.

FIG. 7 illustrates a method 700 for accessing a secure communication system and secure communication device. In one embodiment, a secure communication system, such as secure communication system 600 shown in FIG. 6 implemented with a secure communication device, such as secure communication device 100 shown in FIG. 1, may be stored in a locked enclosure, such as a safe for storage. Method 700 may begin by accessing secure communication device 100 from a locked enclosure, a safe for example, at step 705. A user may activate secure communication device 100 by switching the main CPU on at step 710. Once the main CPU has been initiated at step 710, the main CPU requests the user authenticate his credentials by initiating a security sequence at step 715. Security sequence 715 may include requesting biometric authentication tests from the user. For example, the user may be asked to submit a finger for a fingerprint analysis via a fingerprint scanner, such as fingerprint scanner 215 shown in FIG. 2. The user may be asked to provide a voice sample into a microphone, such as microphone 125 shown in FIG. 1. The user may be asked to submit to a retinal scan via a retinal scanner, such as retinal scanner 120 shown in FIG. 1.

Should a user fail one or more of these tests, the secure communication system determines the user is not accepted at step 720 and locks the wearable secure communication device from use. Should a user pass one or more of these tests at step 730, or in some cases all of these tests, the user becomes an authenticated user at step 730. At step 735, the authenticated user may interface with a white/pink noise generator control to select appropriate levels of noise at step 735. At step 740, the authenticated user may log in to audio and video controls and adjust audio levels and video display characteristics to a preferred level. Once settings within secure communication system are appropriately set, the secure communication system provides secure information processing at step 745. Secure information processing allows a user to access secure information and data, to participate in secure communication sessions, and to otherwise interface with secure or sensitive data while being assured that the information, data, and communications are fully secure within a secure communication device.

Once the authenticated user has accessed the desired information or participated in the desired communication session, the user may log off from the audio and video controls at step 750. The authenticated user may then remove the secure communication device from the authenticated user's head, turn off the main CPU at step 755, and return the secure communication system and secure communication device to the locked enclosure at step 760.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A secure communication system, comprising:
a wearable secure communication device comprising:
a helmet,
a display screen disposed within the helmet,
a noise generator disposed within the helmet,
a power input connection disposed within the helmet,
a communication processor disposed within the helmet;
wherein the helmet receives and transmits information via a network; and
wherein the helmet includes a seal around a head opening of the helmet that reduces the volume of sound generated inside the helmet outside the helmet.

2. The secure communication system of claim 1, wherein the wearable secure communication device is configured to be positioned to cover at least a portion of a user's head.

3. The secure communication system of claim 1, wherein the information received and transmitted via a network is encrypted.

4. The secure communication system of claim 3, wherein the network transmits information from one wearable secure communication device to a secure communication environment.

5. The secure communication system of claim 1, wherein the display screen of the wearable secure communication device is viewable to a user when the user is wearing the secure communication device.

6. The secure communication system of claim 5, wherein the display screen is viewable only to the wearer of the wearable secure communication device.

7. The secure communication system of claim 1, further comprising an authentication device.

8. The secure communication system of claim 7, wherein the authentication device is implemented as one or more of a retinal scan, a finger print analyzer, and a voice print analyzer.

9. The secure communication system of claim 1, wherein the helmet includes a visor.

10. The secure communication system of claim 1, wherein the noise generator generates white noise.

11. The secure communication system of claim 1, wherein the noise generator generates pink noise.

12. A wearable secure communication device which includes:
a noise generator,
a helmet,
a display screen disposed within the helmet,
a power input connection disposed within the helmet, and
a communication processor disposed within the helmet
wherein the helmet includes a seal around a head opening of the helmet that reduces the volume of sound generated inside the helmet outside the helmet.

13. The wearable secure communication device of claim 12, further comprising an air vent disposed on an outside surface of the wearable secure communication device.

14. The wearable secure communication device of claim 12, further comprising a first air duct which connects the vent to a fan and a second air duct which connects to an exhaust.

15. The wearable secure communication device of claim 14, wherein the fan pulls air into the wearable secure communication device and causes air within the wearable secure communication device to be exhausted through the second air duct.

16. The wearable secure communication device of claim 12, wherein the seal is a sound proof seal and positioned on the helmet as to be situated about a neck of a user when the helmet is worn by the user.

17. The wearable secure communication device of claim 12, wherein the wearable communication device includes one or more of a communication connector and a peripheral device connector.

18. The wearable secure communication device of claim 12, further comprising a wiring cavity disposed between an exterior surface of the wearable secure communication device and an interior surface of the wearable secure communication device.

19. The wearable secure communication device of claim 12, further comprising a visor.

20. The wearable secure communication device of claim 19, wherein the visor includes one or more layers of double glazed plexiglass.

* * * * *